United States Patent
Reese

[11] 3,892,124
[45] July 1, 1975

[54] WRISTWATCH ANALYZER

[75] Inventor: Robert O. Reese, Lancaster, Pa.

[73] Assignee: Time Computer, Inc., Lancaster, Pa.

[22] Filed: June 14, 1974

[21] Appl. No.: 479,439

[52] U.S. Cl. .......................... 73/6; 73/71.4; 324/56
[51] Int. Cl. ............................................ G04b 17/00
[58] Field of Search .................. 73/6, 71.4; 324/56

[56] References Cited
UNITED STATES PATENTS

| | | | |
|---|---|---|---|
| 2,031,919 | 2/1936 | Bennett et al. | 73/71.4 |
| 2,535,304 | 12/1950 | Lindborg | 73/6 |
| 2,687,511 | 8/1954 | Penniman | 73/6 |
| 3,238,764 | 3/1966 | Greiner | 73/6 |
| 3,540,207 | 11/1970 | Keeler | 73/6 |
| 3,811,314 | 5/1974 | Anouchi | 73/6 |

*Primary Examiner*—Richard E. Aegerter
*Assistant Examiner*—Richard R. Stearns

[57] ABSTRACT

Disclosed is a device for testing the timing rate of quartz wristwatches and particularly light-emitting diode display watches. It comprises an internal master and an internal slave oscillator. The frequency rate of a watch under test is sensed, amplified and then compared with the internal slave standard. The difference or error rate is multipled and converted into a voltage to actuate a meter. The meter is also used to test battery cells under a simulated watch load.

25 Claims, 17 Drawing Figures

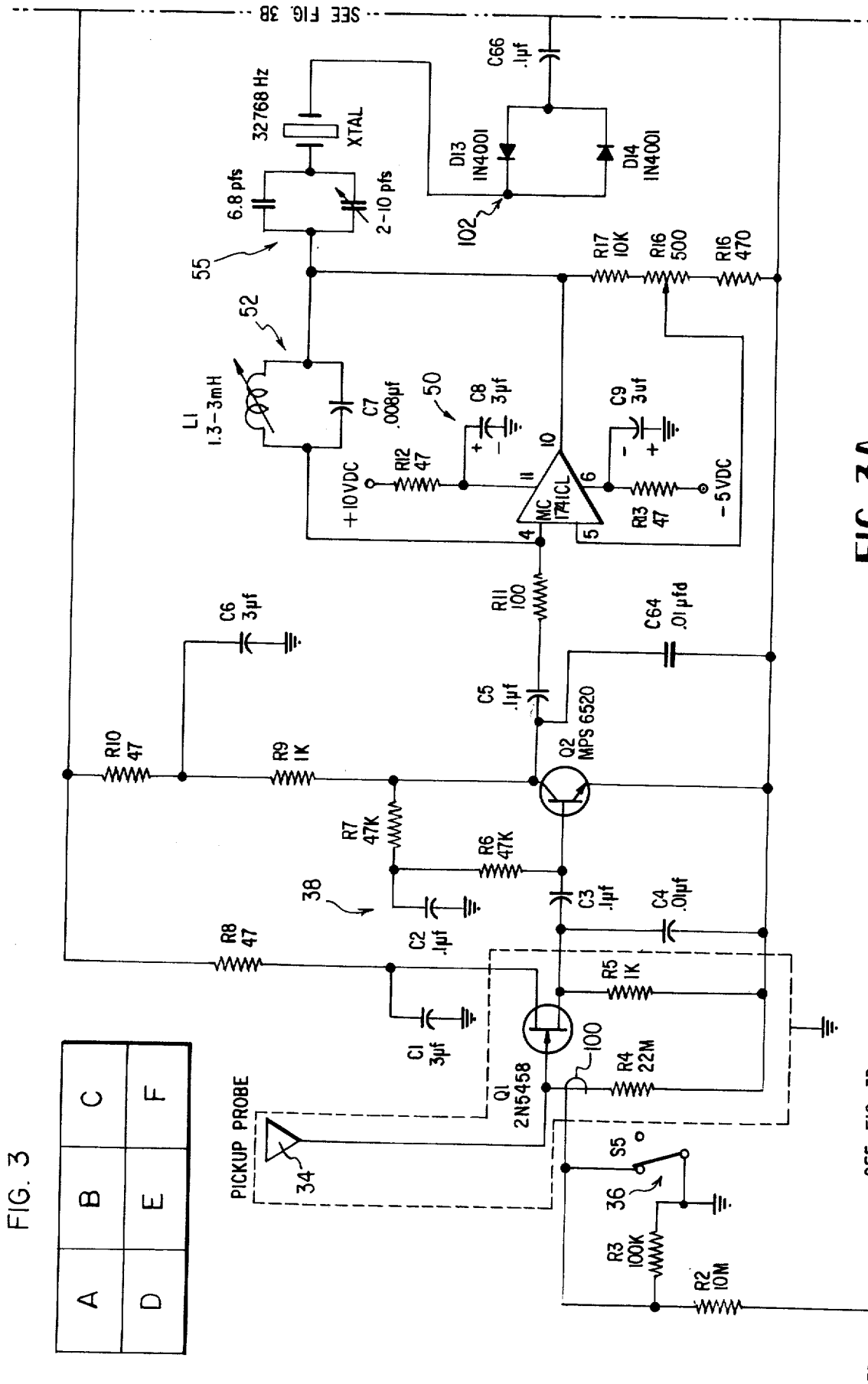

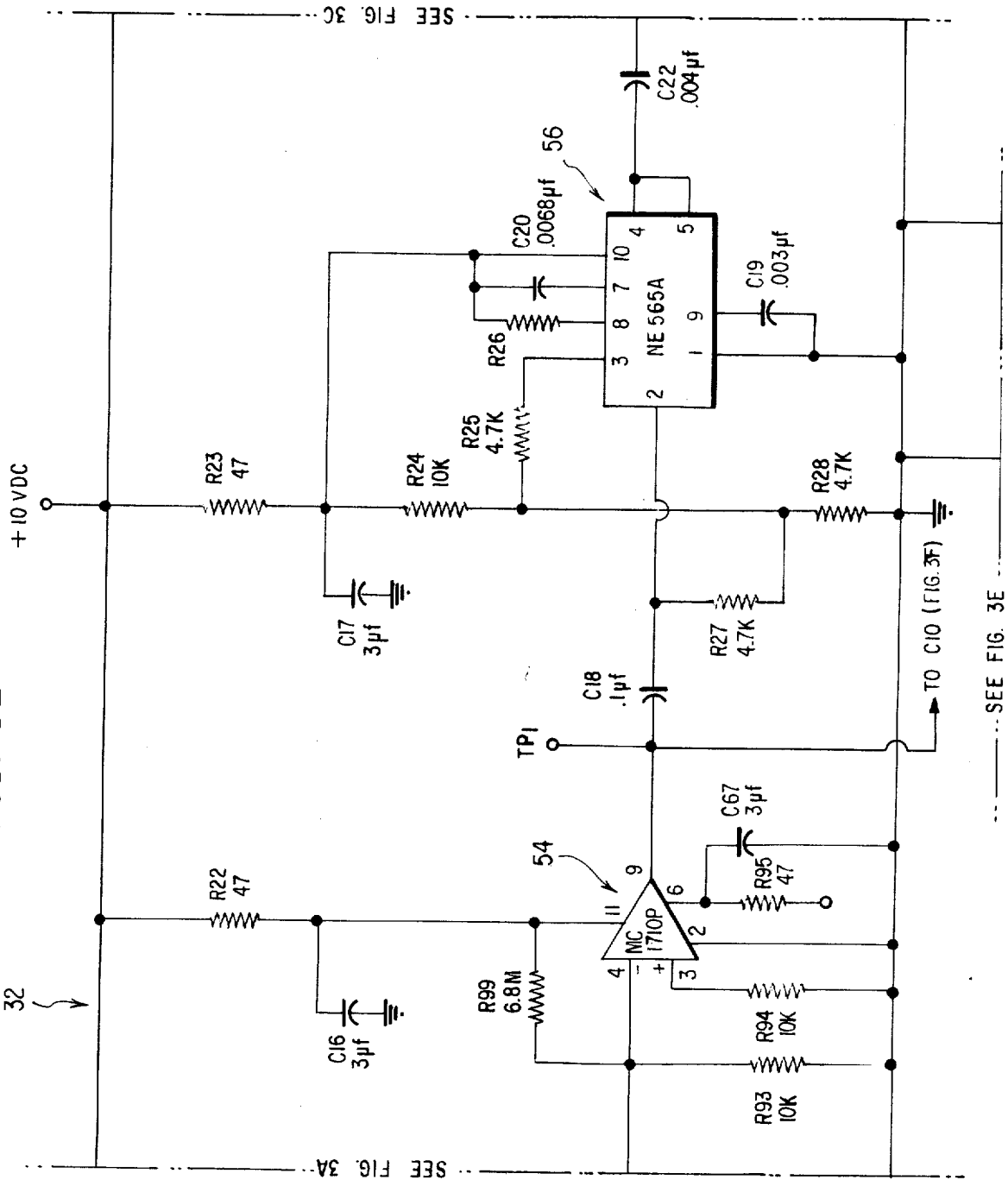

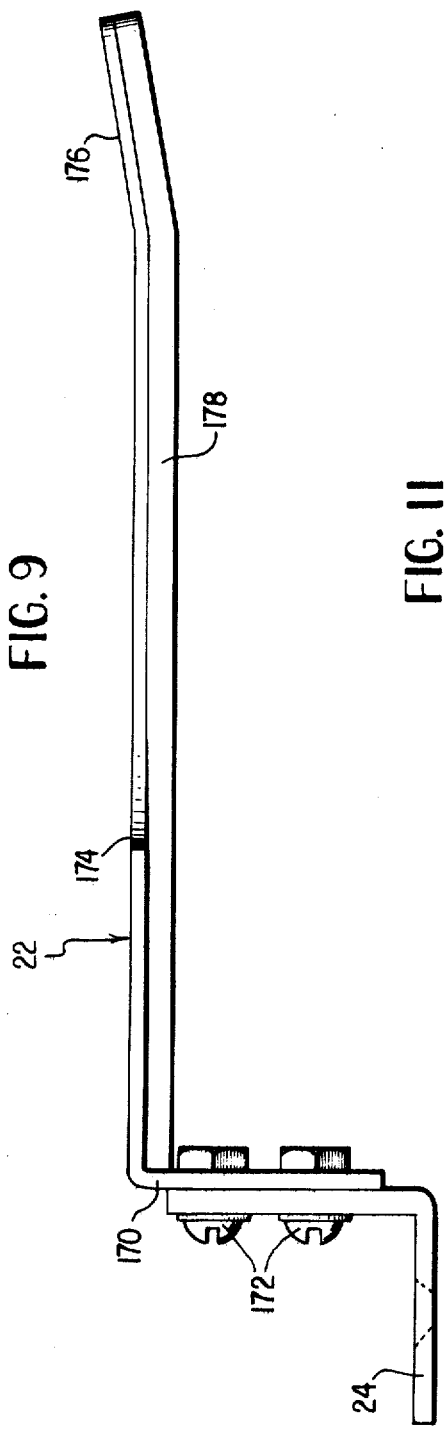
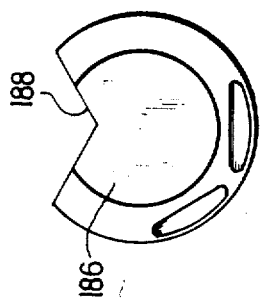
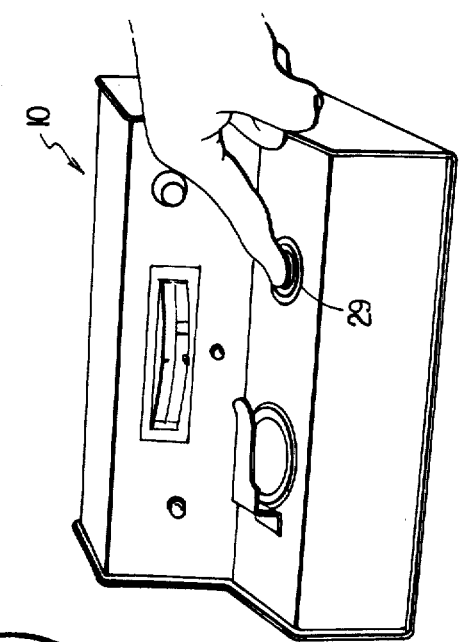
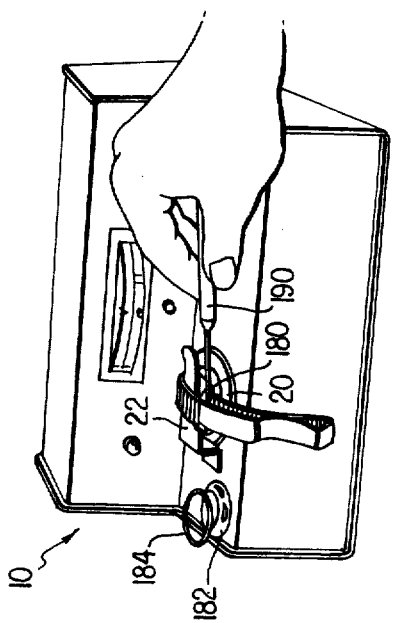

WRISTWATCH ANALYZER

This invention relates to a wristwatch analyzer or tester and more particularly is directed to an electronic instrument which fulfills the needs of jewelers, watchmakers, and the like to determine exactly how fast or slow a cased solid state quartz watch is operating so that proper tolerance can be restored. A front panel fixture working in conjunction with a portion of the frequency measuring apparatus also enables the operator of the instrument to test watch battery cells under a simulated watch load.

Instruments for testing the operating accuracy of a conventional wristwatch have been known for many years. However, a conventional mechanical wristwatch operates at relatively low frequency, commonly in the neighborhood of from 2½ to 3 Hz. Devices for testing conventional watches at this relatively low frequency have been found unsuitable for testing the accuracy of the newer so-called quartz watches in which the timekeeping standard is a quartz crystal oscillator operating at frequencies of several 10's of kHz and higher. Although at least one device has been proposed for testing quartz watches during manufacture there has arisen a need for a relatively simplified and inexpensive instrument which can be used by the jeweler or watchmaker to time the watch.

The present invention is directed to an instrument of this type and in particular one which, while it can be afforded and used by the small watchmaker or jeweler, nevertheless exhibits the precision and reliability necessary to detect very small deviations of time in even the most precise of the generally highly accurate quartz crystal timepieces. While useful in testing and analyzing almost all types of quartz watches, the analyzer of the present invention is particularly adapted to analyze a light-emitting diode quartz crystal watch of the type shown and described for example in assignee's U.S. Pat. Nos. 3,759,031 and 3,803,827 and sold under the Trademark PULSAR. These wristwatches as shipped from the factory are guaranteed to have an accuracy within ± 5 seconds per month with a frequency standard operating at a frequency of 32,768 Hz. This relatively high frequency and extreme accuracy impose severe demands on any analyzer and demands which have in the past not been met by an inexpensive unit that can be bought by a small jeweler or watchmaker and one which is sufficiently simple and reliable in operation that it can be used by operators relatively unskilled in the use of electronic equipment.

In the present invention the operating light-emitting diode wristwatch is placed face down on the test instrument or analyzer. Electro-magnetic energy at the frequency of the watch time standard passes through the viewing window of the watch where it impinges upon a disc-shaped antenna or pickup probe embedded in the instrument support. The high frequency energy detected by the analyzer is amplified and compared with the frequency of a crystal oscillator standard in the analyzer by means of a novel electrical circuit including a plurality of phase lock loops and a plurality of linear mixers. This provides a highly sensitive and accurate circuit arrangement for sensing very small changes in frequency of as little as 1 microwatt of power radiated to the antenna through the viewing window of the watch. The output of the phase lock loop circuitry at a nominal frequency of approximately 1 kHz is converted into D.C. by a detector to produce a D.C. voltage proportional to frequency. This voltage is applied to a meter calibrated to indicate frequency deviation in seconds per month over a frequency range of ± 20 seconds per month. Variations from the desired frequency of as little as ± 0.1 second per month are indicated by the meter.

An additional feature of the present invention is the incorporation in the analyzer of a second oscillator in the form of a precision crystal oscillator to provide a self-test feature. This precision oscillator is at precisely the desired frequency of 32,768 Hz and when applied to the analyzer input the circuit can be adjusted to ensure that the meter indicates "zero" deviation at this frequency. Finally, connected to the meter through a cell test switch is a cell test circuit by means of which watch battery cells may be tested under a load similar to the battery load in the wristwatch.

It is therefore one object of the present invention to provide an improved analyzer for electronic wristwatches.

Another object of the present invention is to provide a wristwatch analyzer of relatively simplified and inexpensive construction which can be purchased and used by even small jewelers and watchmakers.

Another object of the present invention is to provide a wristwatch analyzer particularly adapted for use in testing light-emitting diode-type wristwatches.

Another object of the present invention is to provide a novel phase-locked loop and mixer circuit for detecting timing errors in quartz crystal wristwatches.

Another object of the present invention is to provide a watch analyzer for testing both watch timing and wristwatch battery cell voltage under load.

These and further objects and advantages of the invention will be more apparent upon reference to the following specifications, claims and appended drawings wherein:

Figure 1:
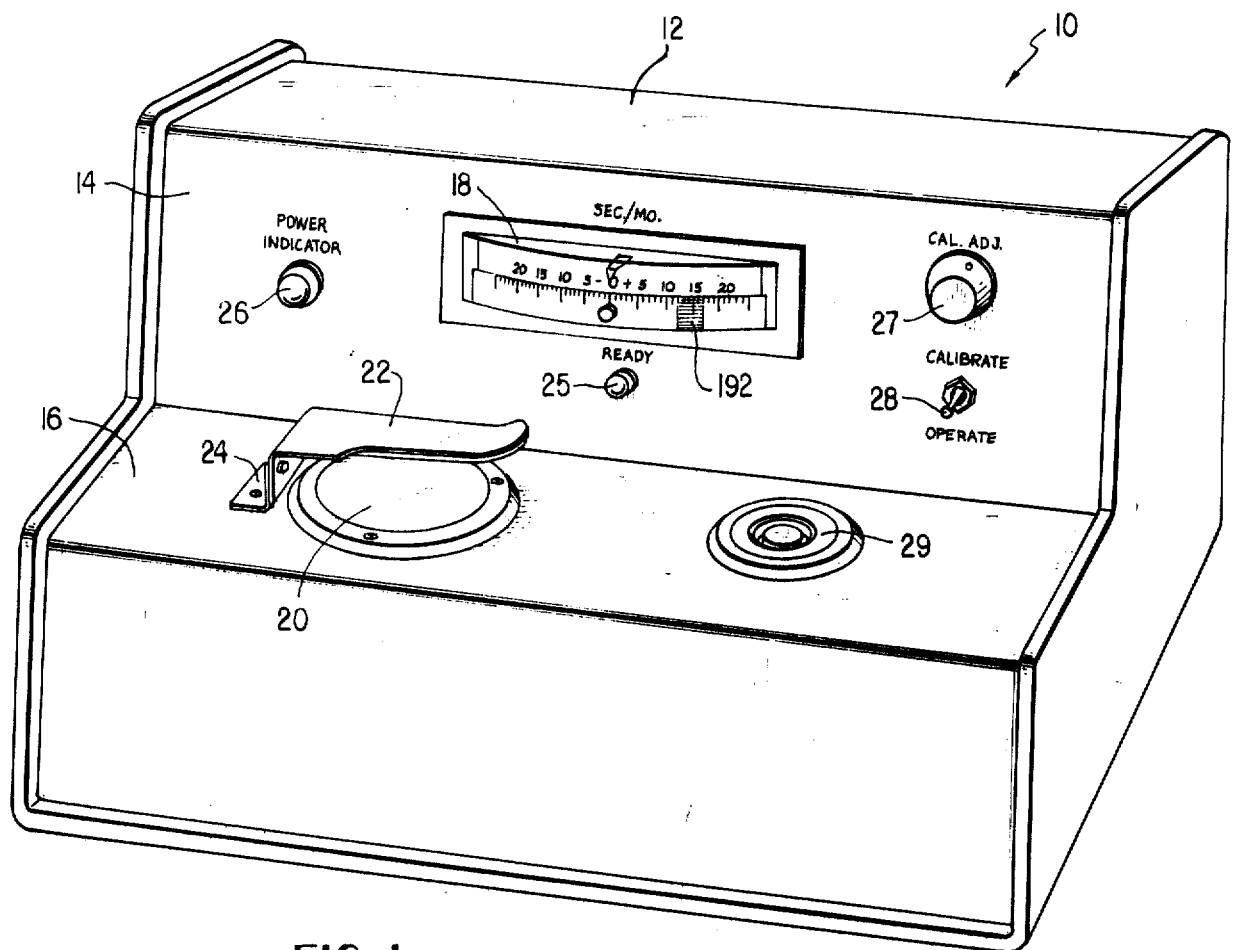
FIG. 1 is a perspective view of a wristwatch analyzer constructed in accordance with the present invention.
Figure 4:
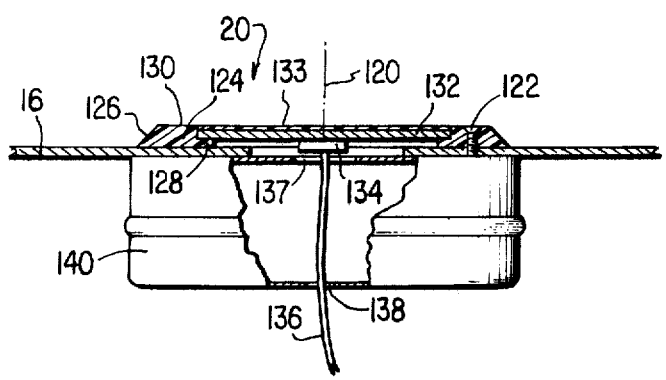
Figure 2:
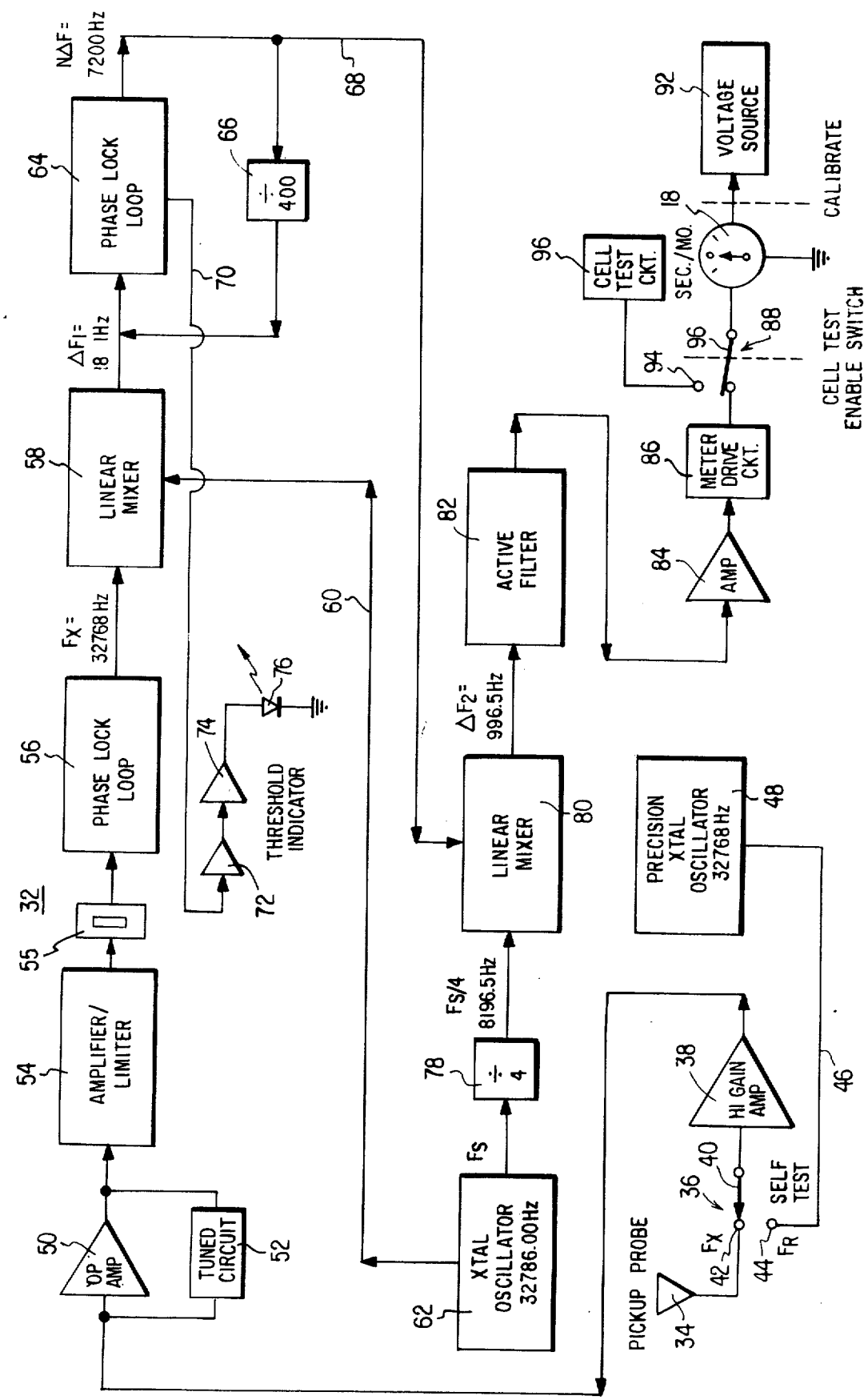
FIG. 2 is a simplified electrical block diagram of the overall analyzer of FIG. 1.
Figure 3C:
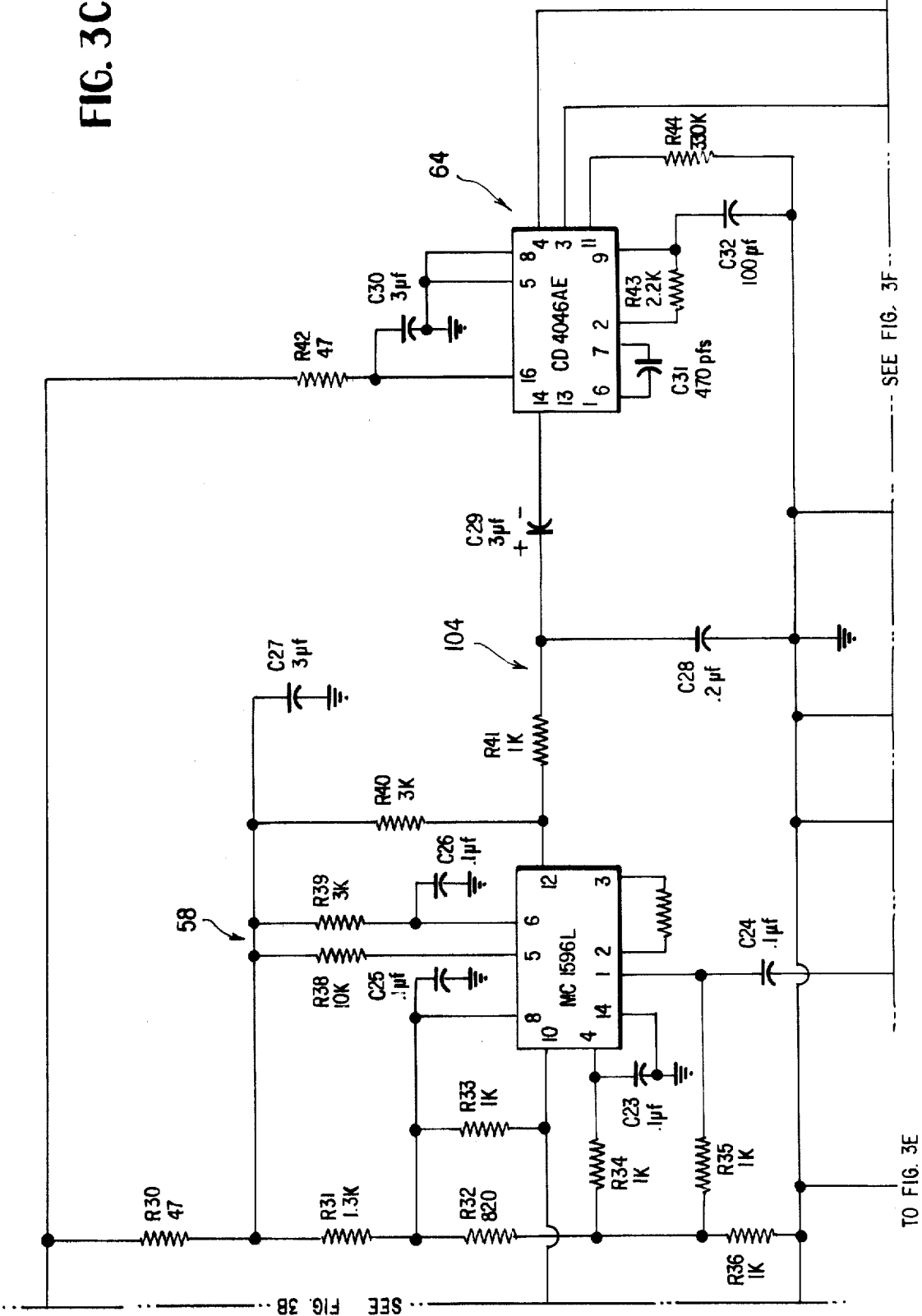
Figure 3D:
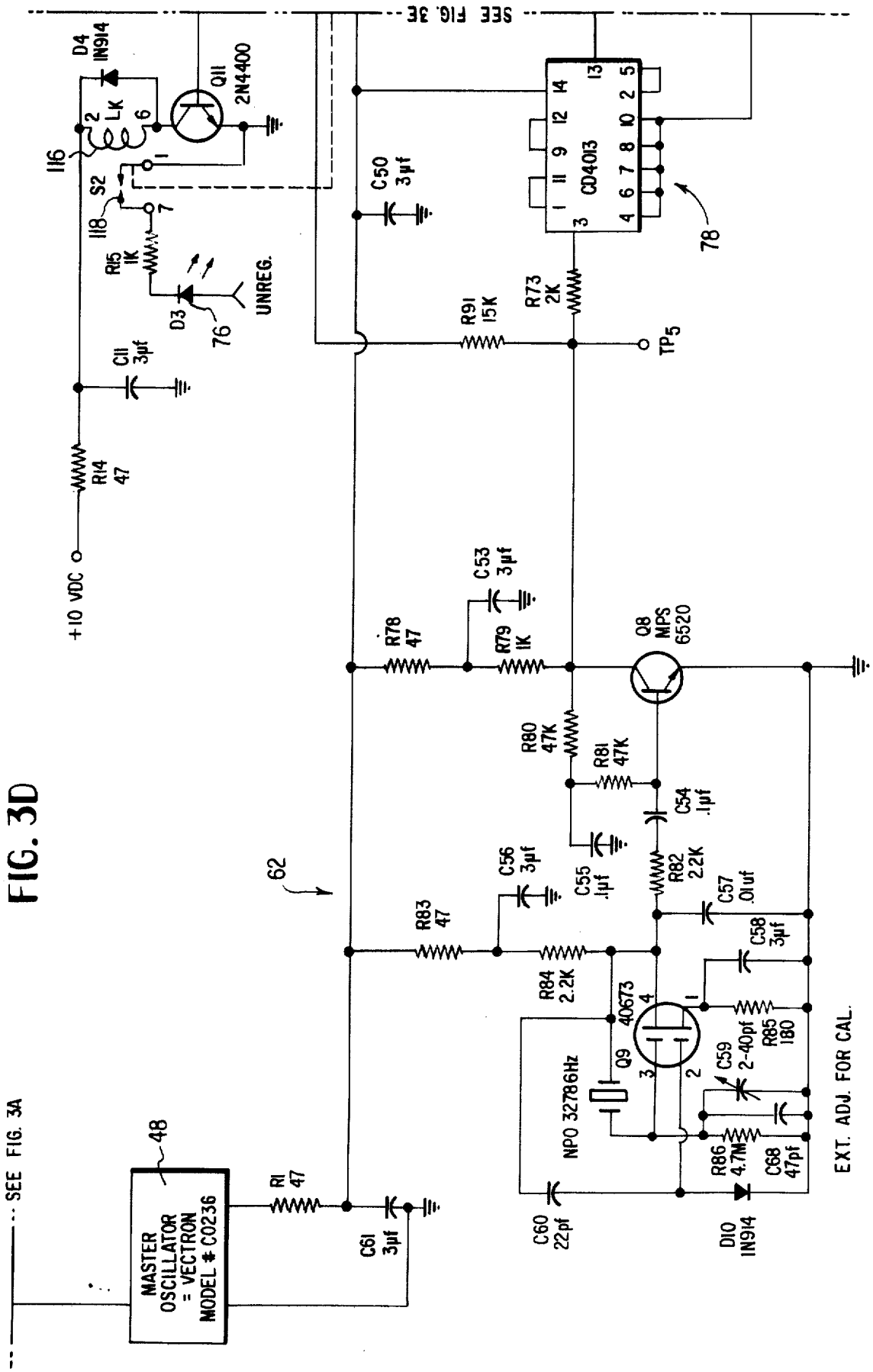
Figure 3E:
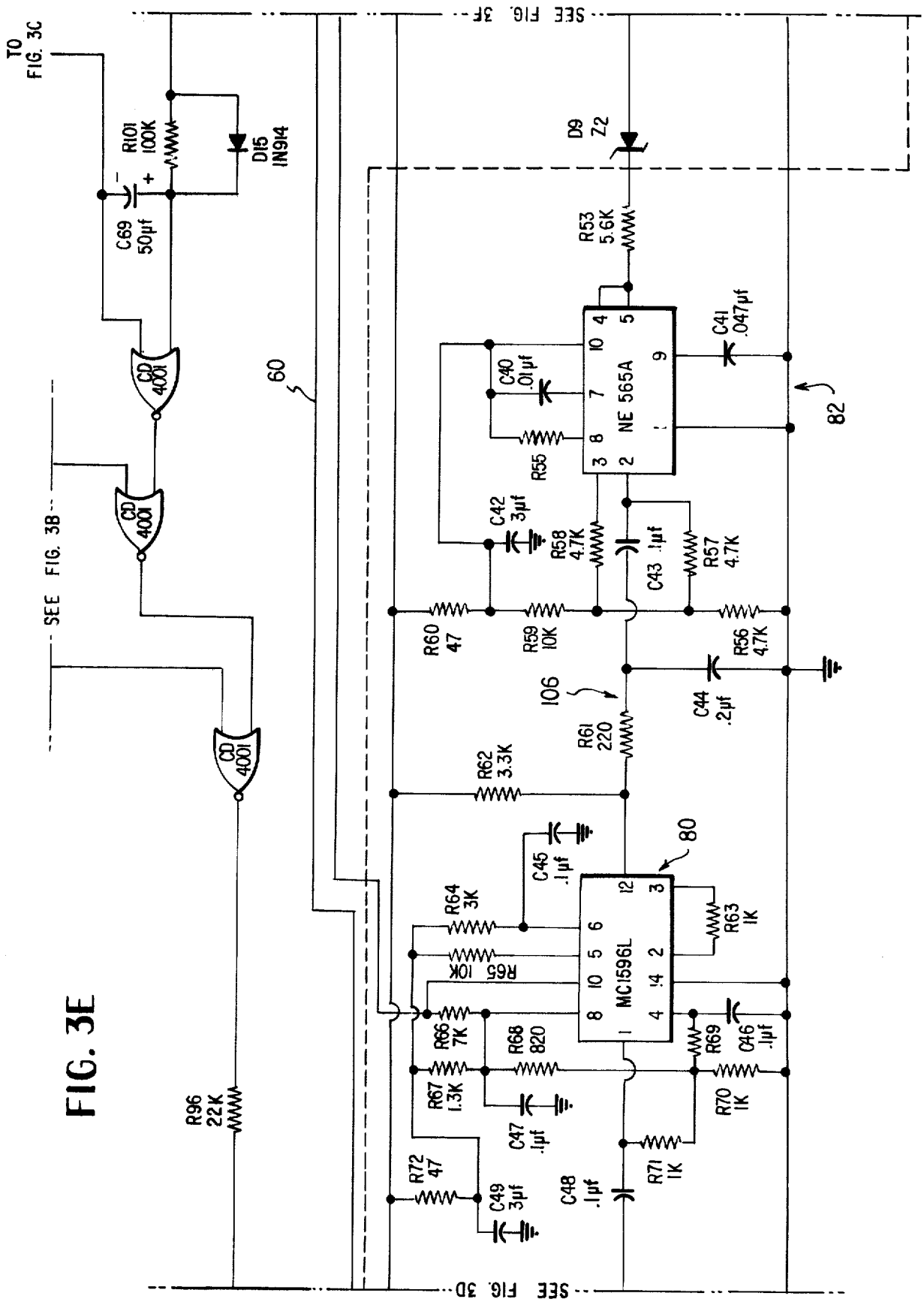
Figure 5:
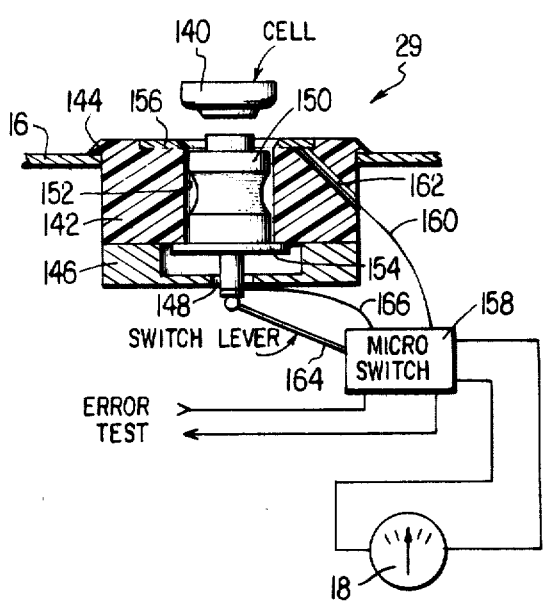
Figure 7:
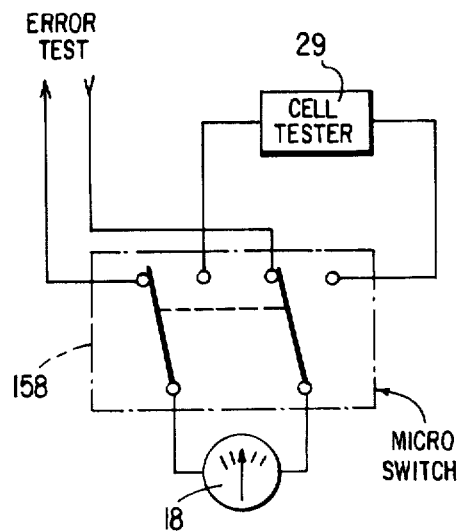
Figure 6:
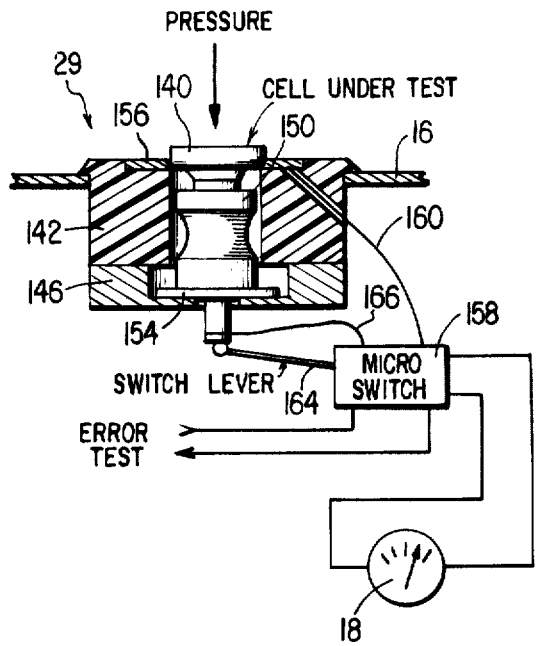
Figure 8:
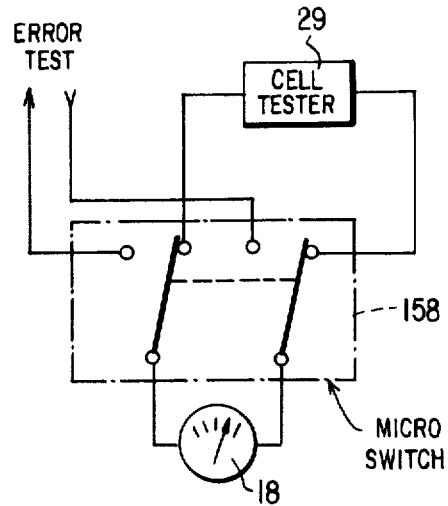

FIGS. 3A through 3F taken together as shown in FIG. 3 constitute a detailed circuit diagram of the analyzer of FIGS. 1 and 2;

FIG. 4 is a partial cross section through the pickup assembly forming the support 20 of FIG. 1;

FIG. 5 is a cross section through the cell tester with a battery cell removed;

FIG. 6 is a cross section similar to FIG. 5 with a battery cell inserted;

FIG. 7 shows the switch position of the cell tester with a cell removed as in FIG. 5;

FIG. 8 shows the switch position of the cell tester with a cell inserted as in FIG. 6;

FIG. 9 is an enlarged elevation of the clamp 22 of FIG. 1;

FIG. 10 is a perspective view of the analyzer of FIG. 1 showing a watch having its timing adjusted;

FIG. 11 is a plan view of a temporary cut-out back plate for the watch used during adjustment; and FIG. 12 is a perspective view of the analyzer showing a watch battery cell being tested.

Referring to the drawings, the analyzer of the present invention generally indicated at 10 in FIG. 1 comprises a stepped housing 12 having a substantially vertical front panel 14 and a substantially horizontal deck 16. Mounted on the vertical section 14 of the front panel is an edge reading meter 18 and on the horizontal section 16 is a support 20 for testing a light-emitting diode wristwatch. By way of example only the wristwatch may be of the type shown and described in assignee's U.S. Pat. Nos. 3,759,031 and 3,803,827. Within the case of such a watch is a timing standard in the form of a crystal controlled oscillator operating at a normal frequency of 32,768 Hz. The oscillator output passes through a frequency divider and display actuator circuit to illuminate a plurality of light-emitting diodes when a demand button on the side of the watchcase is depressed. The illuminated diodes which give a visual indication of time are viewed through a transparent window in the front of the watchcase. Reference may be had to assignee's U.S. Pat. Nos. 3,759,031 and 3,803,827 for a more detailed description of the wristwatch to be tested.

As viewed in FIG. 1, the watch is placed face down on the support 20 so that the transparent window of the wristwatch is in close proximity to an antenna at the top of the support. This antenna is preferably in the form of a flat circular conductive metal disc covered by epoxy or other suitable electrical insulating material which insulation spaces the antenna from the watchcase. Electro-magnetic energy at the frequency of the quartz crystal oscillator within the watchcase is radiated through the viewing window to impinge on the antenna. By removing a back plate on the watchcase, access may be had to a trimmer or tuning capacitor which can be adjusted to vary the timing frequency of the time standard or crystal oscillator of the wristwatch.

Overlying support 20 is an L-shaped conductive metal clamp 22 which is secured to the panel 16 by an angle bracket 24. The clamp supports the watch bracelet and also acts as a radiation shield for the antenna of support 20 to minimize the effects of stray electromagnetic radiation on the antenna. A "ready" light 25 and a "power on" indicator light 26 are on vertical panel 14. Also mounted on this panel are a calibration adjustment knob 27 and a calibrate-operate switch handle 28. Finally, carried by horizontal panel 16 is a watch battery cell tester 29.

FIG. 2 is a simplified electrical block diagram of the overall electrical circuit of analyzer 10 of FIG. 1. The circuit generally indicated at 32 comprises an antenna 34 connected through a switch 36 to a high gain amplifier 38. When the movable contact 40 of switch 36 engages the stationary contact 42, the input of amplifier 38 is connected to the pickup probe antenna 34. When movable contact 40 is manually moved to engage stationary contact 44, the input of high gain amplifier 38 is connected by way of a lead 46 to the output of a self-test oscillator in the form of a precision crystal oscillator 48 operating at the desired or nominal frequency of 32,768 Hz.

High gain amplifier 38 is connected to an operational amplifier 50 which has connected between its input and output a tuned circuit 52. The operational amplifier 50 feeds an amplifier/limiter 54 and crystal filter 55 which is in turn connected to a first phase locked loop 56. The phase locked loop 56 closely tracks the input signal at a frequency $F_x$ from antenna 34 and supplies this signal to one input of a first linear mixer 58. A second input to the linear mixer 58 is by way of a lead 60 from a secondary oscillator or quartz crystal oscillator 62 operating at an offset frequency such as for example 32,786 Hz.

The difference frequency $\Delta F_1$, in this case having a nominal frequency of 18 Hz, at the output of first linear mixer 58 is fed to a second phase locked loop 64. This phase locked loop has connected between its input and output a divider 66 which in the example given divides by 400 so that the output on lead 68 $N\Delta F$ (wherein N is the division ratio of divider 66) has a nominal frequency of 7200 Hz. A second output from phase locked loop 64 appears on a lead 70 and this signal passes through amplifiers 72 and 74 to energize a threshold indicator such as a light-emitting diode 76. Light-emitting diode 76 forms the ready light 25 of FIG. 1 and is energized when a sufficient signal is obtained from the antenna to lock up the phase locked loops 56 and 64.

Secondary oscillator 62 produces a signal at the offset frequency $F_s$ which is supplied to a divider 78 which divides by 4 in the example shown and this signal is applied to one input of a second linear mixer 80. The other input to linear mixer 80 is by way of lead 68 from the output of phase locked loop 64. The difference frequency $\Delta F_2$ at the output of linear mixer 80 is applied to an active filter 82 preferably in the form of a third phase locked loop similar to loops 56 and 64. Active filter 82 produces a clean output signal at the frequency $\Delta F_2$ which is applied to the input of an amplifier 84.

The rectangular wave output signal from amplifier 84 is applied to a meter drive circuit 86 which preferably includes a peak detector and integrator in which the A.C. signal from amplifier 84 is converted into a corresponding D.C. voltage at the output of meter drive circuit 86. This D.C. voltage which has an amplitude proportional to frequency is applied through a switch 88 to a voltmeter or ammeter 18 preferably calibrated in seconds per month. Meter 18 is preferably also connected to a reference voltage source 92 so that when the watch under test is at the desired nominal frequency, meter 18 indicates zero frequency deviation. Switch 88 is preferably provided with a stationary contact 94 so that when its movable contact 96 is manually moved to engage stationary contact 94, meter 18 is connected to a cell test circuit 96 so that the meter will indicate the voltage of a watch battery cell placed in the fixture 29 of FIG. 1.

FIGS. 3A through 3F taken together as shown in Fig. 3 constitute a detailed circuit diagram of the electrical circuit 32 shown in block form in FIG. 2. In FIG. 3, like parts bear like reference numerals and the elements forming the blocks of FIG. 2 are similarly indicated in FIG. 3. Referring to FIG. 3, the pickup probe or antenna 34 is connected to the high gain amplifier 38 which comprises FET transistor Q1 and junction transistor Q2 along with their associated circuit components as illustrated. Switch 36 labeled S5 when in the position shown in FIG. 3A shorts the output of the precision or master oscillator 48 to ground. When the movable contact of this switch is manually moved to its other position, the precision oscillator 48 is loosely coupled or inductively coupled to the gate of FET Q1 as illustrated by the hook 100.

With the switch normally in the position as shown, a signal from the wristwatch under test impinges upon antenna 34 and this signal at the unknown frequency $F_x$ passes through the amplifier stages Q1 and Q2. These transistors comprise a sensing head detector that senses the radiated energy emanating from the quartz oscillator through the viewing window of the cased electronic timepiece. The detected signal $F_r$ is amplified and coupled to the operational amplifier 50 including the broadly tuned circuit 52. The narrow bandpass of the tuned crystal filter circuit 55 allows a signal only 32,768 Hz ± 10Hz to pass through to the high gain differential comparator or amplifier/limiter 54. The two diodes 102 provide a threshold circuit so that the light-emitting diode 76 is only energized when the forward conduction of the diodes 102 is exceeded, i.e., when a signal to the diodes exceeds approximately 0.7 volt RMS. The amplifier/limiter 54 produces a limited rectangular or squarewave at its output which can be sensed at a test point labeled TP1. This squarewave output is sufficient to drive the threshold indicator circuit. The first phase locked loop 56 is approximately tuned to the unknown frequency $F_r$. When a signal is present and is of the desired threshold level, i.e., at least approximately 1.0 volt RMS and within the bandpass of the front end, the loop 56 locks to the signal. The offest frequency $F_x$ as well as the output of the phase locked loop 56 are applied to the first linear mixer 58 and the two frequencies $F_r$ and $F_x$ mix together producing sum and difference frequencies.

The composite signal from the first mixer output is impressed across a low pass filter generally indicated at 104 so that only the difference frequency, i.e., 18 Hz ± 1 Hz is allowed to pass to the second phase locked loop 64. The second phase locked loop is coupled to the second linear mixer 80 which has an additional input receiving the $F_x/4$ signal. As before, these two signals mix together producing a sum and difference frequency. The output from the second linear mixer is again applied through a low pass filter generally indicated at 106 and the active filter 82 synchronizes to the difference frequency signal $F_2$, thus rejecting the sum signal. The output of the active filter 82 is an image frequency of the input, but free of noise and harmonics. This second $F_2$ signal is amplified by impedance matching amplifier 84 including transistor Q6 and is coupled to the meter drive circuit 86.

Figure 3F:
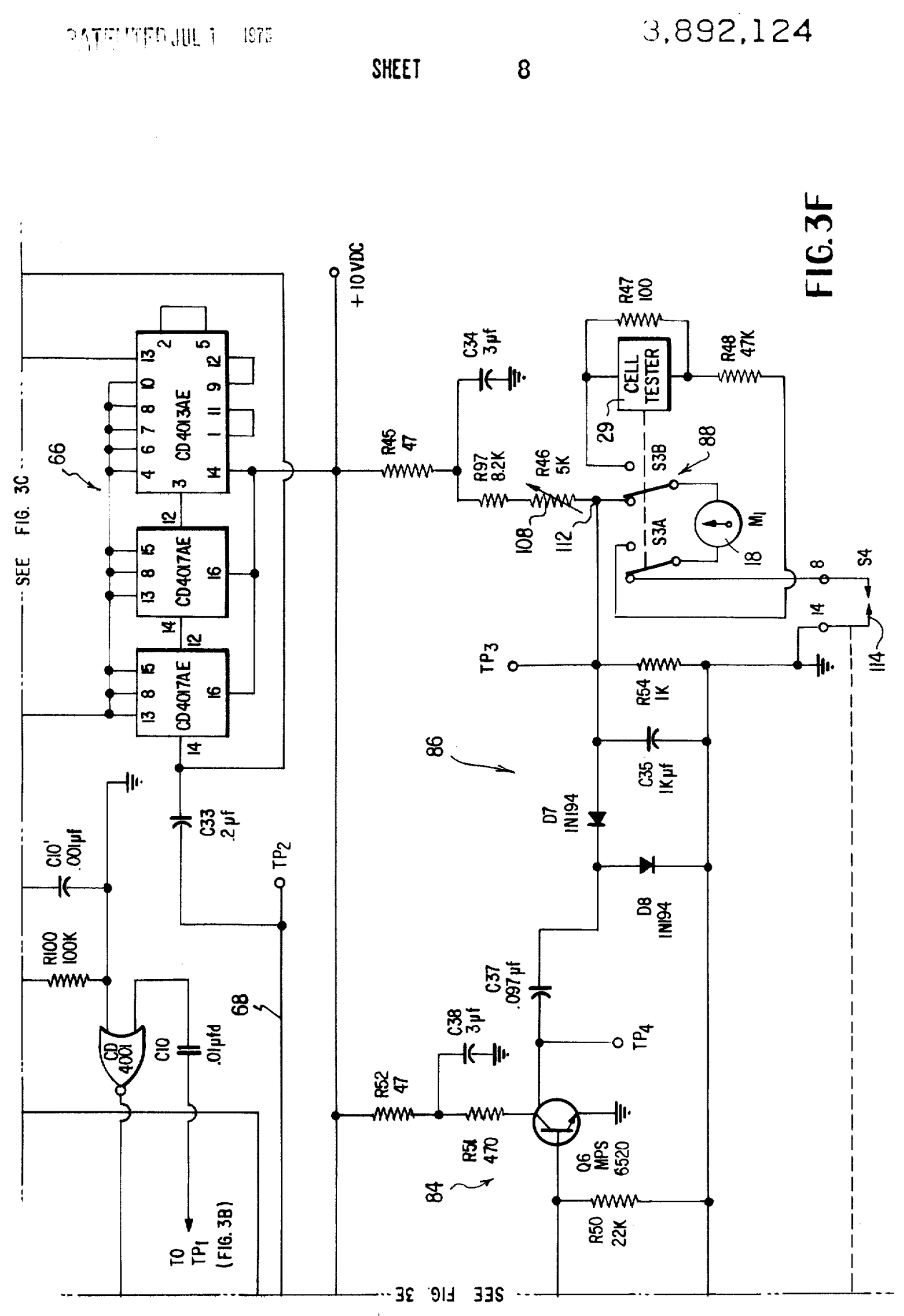

The meter is calibrated by a suitable selection of capacitor C37 and resistor R97 is FIG. 3F. Fine adjustment may be made by adjusting the variable resistor 108 (R46) through manual rotation of the knob 27 of FIG. 1. When the watch being tested is exactly on frequency, the meter reads zero since the negative D.C. voltage from meter drive circuit 86 is exactly blocked out or cancelled by a positive voltage from a regulated +10 volt D.C. power supply through resistor 108. That is, the potential point 112 in FIG. 3F is set to be at system ground or zero potential. Meter 18 by way of example may be a Weston Model 121 which is an edge reading high impedance meter having a range of from −50 to +50 microamps. Switches S3A and S3B are ganged to form a double pole double throw switch for also connecting meter 18 to the cell tester 29 and when the meter is connected to the cell tester, a battery cell has its voltage indicated by meter 18 as either within an acceptable range or outside of it. The cell is tested across a 100 Ohm load resistor R47 which simulates the load on a battery cell during actual operation in a watch. Meter deflection to the desired or acceptable range is obtained by suitable selection or resistor R48 in FIG. 3F.

The meter is also disconnected from the remainder of the time testing circuit by a set of relay contacts 114 which are operated by a relay coil 116 in the collector circuit of transistor Q11 of FIG. 3A. At the same time, ligh-emitting diode 76 is disconnected by relay contacts 118 and the diode indicator and meter are not reconnected into the circuit until the phase locked loops have locked onto a signal and relay 116 is re-energized. This prevents the diode from lighting and giving an operative indication until a tracking lock is obtained and prevents the meter from drifting to an arbitrary level when there is no input.

The meter is preferably calibrated to indicate a measurement error of ±20 seconds per month. An out-of-tolerance timepiece can be restored to zero variation within ±0.1 seconds per month. To calibrate the instrument, the high gain amplifier 38 is connected to the meter or precision frequency oscillator 48. In this self-test/calibrate mode, the meter should indicate zero error. If it deflects from zero, the error is corrected by simply adjusting the precision calibration potentiometer 108 until the indicating meter returns to zero. The input sensitivity of the analyzer is −60dBm where 0 dBm = 1 milliwatt in 50 Ohms. Stated another way, this is the lowest level of radiated energy the unit will sense causing the phase locked loops to capture and lock. The analyzer has a passband of 10Hz. about the center frequency of 32,768 Hz. System accuracy is ± 0.38 parts per million in a temperature range of 22°-35°C.

FIG. 4 is a partial cross section through the pickup forming the support 20 of FIG. 1. Attached to the top surface of deck 16 by three screws equally spaced about a central axis 120, one of which screws is illustrated at 122, is a ring 124 having its outer edge beveled as at 126. Ring 124 is preferably made of a suitable electrical insulating material, such as a black Lexan plastic. Ring 26 is provided with an annular ledge 128 and bonded to this ledge so as to be substantially flush with the upper surface 130 of the ring is a flat, solid, circular disc 132 which forms the pickup or antenna 34 previously described. The top surface of electrically conductive disc 132 which is preferably made of one-half hard brass, is coated with a 0.005 inch thick coating 133, of plastic material, such as Teflon.

Bonded to the underside of the antenna or disc 132 is an electrical terminal 134 to which is connected lead wire 136. This lead passes through suitable apertures 137 and 138 in the top and bottom of an electrical shield can 140. The top of can 140 is secured to the underside of deck 16 by the same three screws 122. When a wristwatch is placed face down on the Teflon coating of disc 132, electromagnetic radiations from the crystal oscillator within the watch impinge upon the disc which acts as an antenna for picking up these radiations.

FIG. 5 is a cross section through the battery tester 29 of FIG. 1. Also shown in FIG. 5 is a battery cell 140 which, by way of example only, may be a conventional 1½ volt watch battery cell, with the light-emitting diode wristwatch normally comprising two such cells connected in series to provide a nominal watch battery voltage of 3 volts. Tester 29 comprises an electrically insulated annular plastic housing 142, again preferably made of black Lexan having a beveled flange 144 suitably bonded to deck 16. Bonded to the underside of housing 142 is a brass disc 146 centrally apertured as at 148 to pass the lower end of an electrically conductive brass pin 150 slidable along the central aperture 152 of housing 142. Pin 150 is provided with an integral flange 154 which acts as a stop to engage housing 142 limiting the upward movement of the pin and disc 146 limiting the downward movement of the pin.

Received in a recess in the top of housing 142 is a conductive metal or brass ring 156 and this ring is electrically connected to a microswitch 158 by a lead 160 passing through a downwardly and outwardly extending hole 162 provided in housing 142. The lower end of pin 150 engages the switch lever 164 of the conventional spring biased microswitch 158 and the pin is electrically connected to the microswitch by a flexible lead 166. Microswitch 158 in FIG. 5 forms the switch 88 of FIGS. 2 and 3F and is connected to the edge reading meter 18. FIG. 7 shows the electrical circuit connection for microswitch 158 of FIG. 5 when the battery cell 140 is removed from the tester, as illustrated in FIG. 5. FIG. 6 shows the tester of FIG. 5 with the battery cell 140 inserted in the tester and held in it by the pressure of the finger of an operator of the analyzer. Connection to one terminal of the battery cell 140 is by way of conductive ring 156 and lead 160 to the microswitch 158. The other terminal of the battery is connected to the microswitch through electrically conductive pin 150 and flexible lead 166. Downward movement of pin 150 in FIG. 6 forces switch lever 164 downwardly to operate the microswitch so that it forms the electrical connections illustrated in FIG. 8 in which the cell tester 29 is connected to meter 18. When finger pressure is removed from the top of battery cell 140, microswitch 158 urges switch lever 164 upwardly back into the position illustrated in FIG. 5 so that pin 150 returns to the position illustrated in that FIGURE with the battery cell electrically disengaged from conductive ring 156.

FIG. 9 is a side elevation of the clamp 22 and support bracket 24 of FIG. 1. Clamp 22 is generally L-shaped in construction and includes a short leg 170 attached to angle bracket 24 by screws 172. Angle bracket 24 is similarly adapted to be screwed into the deck 16 in FIG. 1. Clamp 22 is stepped to a narrower width as indicated at 174 and its outer end or tip 176 is preferably bent slightly upwardly, as illustrated in FIG. 9. If desired, the underside of clamp 22 may have bonded to it a layer 178 of electrically conductive rubber, for example 0.065 inch thick. The clamp itself is preferably made of electrically conductive hard brass so as to help shield the antenna beneath it against stray electromagnetic radiation.

FIGS. 10–12 are helpful in illustrating the manner of operation of the analyzer 10 of FIG. 1. FIG. 10 shows the analyzer with a wristwatch resting on the support 20 with the watch bracelet looped over clamp 22. The watch is shown in FIG. 10 being adjusted for timing rate as it rests on the support. FIG. 11 shows a temporary backplate with a cutout portion used during the adjustments illustrated in FIG. 10 and FIG. 11 shows a battery cell being checked in the battery tester 29.

As will be noted, there is no ON/OFF switch on the analyzer 10. It is plugged directly into any standard A.C. power supply of 60 Hz 110/120 volts. To maintain optimum stability of the analyzer's quartz reference standard, the device is always left on. It is preferred that when first plugged in, 30 minutes be allowed before attempting to use it to give all components an opportunity to stablize.

In order to test a wristwatch, switch handle 28 of FIG. 1 is turned to the "calibrate"position. The operator then waits until the red ready light 25 comes on and the meter 18 reacts. If the meter indicator is not pointing to center (zero), the adjustment knob 27 is turned to achieve this correction. After the meter has been set, switch handle 28 is moved to the "operate" position. The device is now ready for testing a wristwatch. In the preferred mode of operation, the meter calibration is checked each time before a test is carried out. A wristwatch such as that illustrated at 180 in FIG. 10 is placed face down on the support 20 with the wristband or strap looped over clamp 22 as illustrated. After a moment, the ready light 25 again lights up and the meter reacts to give an indication of how fast or slow the wristwatch is operating. An acceptable tolerance for a light-emitting diode wristwatch of the type previously described is five seconds per month.

If the meter indicates that the wristwatch is out of tolerance, and adjustment is desired, the back case is removed, leaving the two battery cells in position. The back case and sealing ring illustrated at 182 and 184, respectively, may be placed on the deck 16, as illustrated in FIG. 10, and the back plate 182 replaced by a temporary backplate 186 as illustrated in FIG. 11. Temporary backplate 186 is identical to the regular backplate 182 with the exception that it is cutaway about a portion of its periphery as illustrated at 188. This cutaway portion permits access for a screwdriver or similar tool as illustrated at 190 in FIG. 10, which can be inserted and rotated to adjust the setting of the screw on the variable capacitor or tuner of the quartz crystal oscillator forming the time standard of the wristwatch. Once the oscillator has been tuned to within acceptable limits, the temporary backplate is removed, the sealing ring 184 and permanent backplate 182 reattached to the back of the watchcase and the watch is reset to the correct time in the normal manner.

Testing the battery cell is illustrated in FIG. 12. During this test, switch lever 28 should be in the operate position. The power cell is placed in the tester 29 brass side (minus) down, and pressed down lightly by the forefinger of the operator. This activates the meter 18. The meter is preferably provided with a green band 192 as illustrated in FIG. 1 and if the meter indicator swings over the right side in the area marked by this green band, the cell is good. If the indicator does not move into the green band, the wristwatch battery cells should be discarded and fresh cells installed. Even if only one of the two watch battery cells fails the test, they should both preferably be replaced.

In the preferred construction, the edge reading meter 18 is calibrated to read an error in seconds per month. In the embodiment described, the master reference standard of the analyzer is accurate to ±0.3 second per year at a temperature of 76°F; with temperature ranges of 68° to 86°F, this timing tolerance broadens to 3/5 second per year.

It is apparent from the above that the present invention provides a simplified and relatively inexpensive device for testing and analyzing quartz crystal wristwatches and particularly light-emitting diode watches. It is particularly adapted for use by watchmakers and jewelers and for this reason is of relatively low cost and simple and easy to operate. However, at the same time, it evidences improved sensitivity and reliability so that even small errors in the very precise timepieces of this type may be sensed and corrected.

This invention may be embodied in other specific forms without departing from the spirit or essential scope thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A timing rate tester for wristwatches having an electrical time standard comprising a wristwatch support including an antenna for sensing electrical energy from the time standard of an operating wristwatch mounted on said support, a reference frequency source, means coupled to said antenna and said reference frequency source for comparing the frequencies of electrical signals from them, and a meter coupled to said comparison means for indicating the results of a comparison.

2. A tester according to claim 1 including means for testing the voltage of a wristwatch battery cell coupled to said meter.

3. A tester according to claim 2 wherein said cell testing means includes means for testing a cell under a simulated watch load.

4. A tester according to claim 1 wherein said support comprises a flat metal plate forming said antenna.

5. A tester according to claim 4 wherein said plate has its top surface covered with an electrically insulating coating.

6. A tester according to claim 4 including a conductive metal plate overlying but spaced from said antenna to shield said antenna from stray radiation.

7. A tester according to claim 6 including a layer of resilient material secured to the underside of said shielding plate.

8. A tester according to claim 6 wherein said shielding plate has an upturned end and is adapted to receive the arm band of a wristwatch resting on said support.

9. A tester according to claim 1 wherein the frequency of said reference frequency source is offset from the normal operating frequency of a wristwatch to be tested.

10. A tester according to claim 9 including a precision frequency source having the normal operating frequency of a wristwatch to be tested, and a switch for coupling said precision frequency source to said comparison means in place of said antenna.

11. A tester according to claim 10 wherein said precision frequency source has a frequency of 32,768 Hz.

12. A tester for wristwatches with crystal oscillator time standards comprising a metal plate acting as an antenna and forming a support for a wristwatch to be tested, a reference frequency source, a mixer coupled to said antenna and said reference frequency source for producing an output signal indicative of the difference in frequency between said source and a signal sensed by said antenna from the time standard of a watch, and a meter coupled to said mixer for giving an indication of the difference.

13. A tester according to claim 12 including a phase locked loop coupling said mixer to said meter.

14. A tester according to claim 13 including a threshold indicator coupled to said phase locked loop.

15. A tester according to claim 14 including a second phase locked loop coupling said antenna to said mixer.

16. A tester according to claim 12 including a frequency multiplier coupling said mixer to said meter.

17. A tester according to claim 16 wherein said frequency multiplier comprises a phase locked loop and a divider.

18. A tester according to claim 16 including a second mixer having its output coupled to said meter, means coupling a first input of said second mixer to said frequency multiplier, and means coupling a second input of said second mixer to said reference frequency source.

19. A tester according to claim 18 wherein said means coupling a second input of said second mixer to said reference frequency source comprises a divider.

20. A tester according to claim 12 including a battery cell tester, a simulated watch load impedance across said cell tester, and a switch for coupling said meter to said cell tester.

21. A tester according to claim 20 wherein said cell tester comprises an electrically insulating housing, a microswitch, a conductive ring on the top of said housing coupled to said microswitch, and a conductive pin slidably mounted in the center of said housing and electrically coupled to said microswitch.

22. A tester according to claim 21 wherein said microswitch comprises an upwardly spring biased actuating lever whereby downward movement of said pin against said lever actuates said switch.

23. A method of testing a wristwatch having a crystal controlled oscillator time standard with a trimmer capacitor comprising placing the watch face down on a support, sensing the frequency of the watch time standard by an antenna mounted externally of the watch, comparing this frequency with a reference frequency, and indicating the amount by which is differs from normal.

24. A method according to claim 23 including the step of adjusting said trimmer capacitor to correct the frequency of said time standard.

25. A method according to claim 24 including the step of replacing the back plate of the watch with a temporary back plate having an aperture permitting access to said trimmer capacitor.

* * * * *

UNITED STATES PATENT OFFICE
CERTIFICATE OF CORRECTION

Patent No. 3,892,124      Dated July 1, 1975

Inventor(s) Robert O. Reese

It is certified that error appears in the above-identified patent and that said Letters Patent are hereby corrected as shown below:

Col. 4, line 39, "zero" should read --"zero"--.

Col. 5, line 20, "to the signal" should read --to that signal--.
Col. 5, line 47, line 52, "zero" should read --"zero"--.
Col. 6, line 3, "ligh" should read --light--.
Col. 6, lines 14, 17, 18, and 20, "zero" should read--"zero"--.
Col. 6, line 27, "of 22-35° C." should read -- of from 22-35°C.--.
Col. 7, line 12, "or" should read --of--.
Col. 7, line 68, "ready" should read --"ready"--.
Col. 8, line 37, "operate" should read --"operate"--.

Signed and Sealed this eighteenth Day of November 1975

[SEAL]

Attest:

RUTH C. MASON
Attesting Officer

C. MARSHALL DANN
Commissioner of Patents and Trademarks